(12) United States Patent
Hirasawa et al.

(10) Patent No.: US 12,301,975 B2
(45) Date of Patent: May 13, 2025

(54) IMAGE PICKUP APPARATUS

(71) Applicant: CANON KABUSHIKI KAISHA, Tokyo (JP)

(72) Inventors: Takami Hirasawa, Tochigi (JP); Yuichiro Kato, Tochigi (JP); Toshimune Nagano, Saitama (JP); Toru Matsumoto, Tochigi (JP); Masayasu Mizushima, Tochigi (JP); Akino Moriyoshi, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 130 days.

(21) Appl. No.: 18/362,186

(22) Filed: Jul. 31, 2023

(65) Prior Publication Data
US 2024/0048837 A1 Feb. 8, 2024

(30) Foreign Application Priority Data
Aug. 2, 2022 (JP) .................. 2022-123340

(51) Int. Cl.
*H04N 23/58* (2023.01)
*H04N 23/60* (2023.01)
(Continued)

(52) U.S. Cl.
CPC ............ *H04N 23/58* (2023.01); *H04N 23/64* (2023.01); *H04N 23/667* (2023.01); *H04N 23/681* (2023.01); *H04N 23/695* (2023.01)

(58) Field of Classification Search
CPC .. H04N 23/64; H04N 23/695; H04N 23/6812; H04N 23/58; H04N 23/681;
(Continued)

(56) References Cited

U.S. PATENT DOCUMENTS 7,349,022 B2 * 3/2008 Okada .................. H04N 23/687
348/208.99
8,823,812 B2 * 9/2014 Nguyen .................... G03B 5/00
348/208.6
(Continued)

FOREIGN PATENT DOCUMENTS

JP 2925150 B2 7/1999
JP 2015195497 A 11/2015
(Continued)

*Primary Examiner* — Pritham D Prabhakher
(74) *Attorney, Agent, or Firm* — ROSSI, KIMMS & McDOWELL LLP (57) ABSTRACT

An image pickup apparatus comprises at least one of a sixth lens unit and an eighth lens unit being movable in a direction orthogonal to an optical axis, a first shift driver or a second shift driver driving the sixth or eighth lens unit, a first shift position detector or a second shift position detector detecting a position of the sixth or eighth lens unit, a photographing condition controller controlling imaging conditions, a detector detecting at least one of a moving speed and a moving direction of an object, and a shift controller controlling the sixth or eighth lens unit based on a signal from the detector. The photographing condition control unit has a following shot mode in which an exposure and a driving of the sixth or eighth lens unit are intermittently performed with respect to a movement of the object.

9 Claims, 8 Drawing Sheets

(51) Int. Cl.
    *H04N 23/667*    (2023.01)
    *H04N 23/68*    (2023.01)
    *H04N 23/695*    (2023.01)

(58) Field of Classification Search
    CPC .... H04N 23/673; H04N 23/667; H04N 23/62; H04N 23/60; H04N 23/687
    USPC .................................................. 348/207.99
    See application file for complete search history.

(56) References Cited

U.S. PATENT DOCUMENTS

| | | | | |
|---|---|---|---|---|
| 9,477,138 | B2* | 10/2016 | Brunner | H04N 23/62 |
| 10,567,640 | B2 | 2/2020 | Miyazawa | |
| 10,694,109 | B2* | 6/2020 | Shingu | H04N 23/70 |
| 11,653,094 | B2* | 5/2023 | Sakurai | H04N 23/633 |
| | | | | 348/208.1 |
| 2003/0210343 | A1* | 11/2003 | Okada | H04N 23/68 |
| | | | | 348/E5.045 |
| 2011/0234826 | A1* | 9/2011 | Nguyen | G03B 17/20 |
| | | | | 348/208.6 |
| 2014/0300766 | A1* | 10/2014 | Nakamura | H04N 23/68 |
| | | | | 348/208.2 |
| 2015/0237260 | A1* | 8/2015 | Mukunashi | H04N 23/6815 |
| | | | | 348/208.11 |
| 2018/0172949 | A1* | 6/2018 | Oogami | H04N 23/959 |
| 2019/0230287 | A1* | 7/2019 | Shingu | H04N 23/55 |
| 2022/0103753 | A1* | 3/2022 | Kojima | H04N 25/61 |
| 2022/0303465 | A1* | 9/2022 | Sakurai | H04N 23/6812 |

FOREIGN PATENT DOCUMENTS

| | | |
|---|---|---|
| JP | 2019075607 A | 5/2019 |
| JP | 2021085925 A | 6/2021 |

* cited by examiner

The optical axis of the optical system 201a is not inclined with respect to the imaging plane 200a.

FIG. 3B

The optical axis of the optical system 201b is inclined with respect to the imaging plane 200b.

FIG. 3C

Inclinations of object plane 202c and imaging plane 200c of the present embodiment

The moving direction is predictable (outside of the angle of view A)

FIG. 6B

The moving direction is predictable (inside of the angle of view A)

FIG. 6C

The moving direction is unpredictable (outside of the angle of view A)

FIG. 6D

The moving direction is unpredictable (inside of the angle of view A)

IMAGE PICKUP APPARATUS

BACKGROUND OF THE INVENTION

Field of the Invention

The present disclosure relates to an image pickup apparatus.

Description of the Related Art

As a shooting method for expressing a sense of dynamism, there is a technique called following shot (tracking shot) in which an object is captured in a stopped state and a background is captured in a flowing state by releasing a shutter at a low speed while following the moving object. In the following shot, since the shutter is released at a low speed while the camera is being shaken, the following shot is easily affected by camera shake, and it depends on the skill of the photographer to take a photograph with little blur.

SUMMARY OF THE INVENTION

Japanese Patent No. 2925150 discloses a technique for automatically performing following shot in a state in which a camera is stationary as a following shot method that does not depend on the skill of a photographer.

In Japanese Patent No. 2925150, since the following shot is started when the object appears at the position set in advance, when the composition is different from the intended composition, the photographing is performed again, and there is a possibility that the opportunity of the photographing is lost.

An object of embodiments provides, an image pickup apparatus capable of following shot with different compositions.

According to an embodiment of the present disclosure, an image pickup apparatus comprising: at least one shifting optical member configured to be movable in a direction orthogonal to an optical axis; a driving unit configured to drive the shifting optical member; a position detector configured to detect a position of the shifting optical member; a condition control unit that controls imaging conditions; a detection unit configured to detect at least one of a moving speed and a moving direction of an object; and a shift control unit configured to control the shifting optical member based on a signal from the detection unit; wherein the condition control unit has a control mode in which an exposure and a driving of the shifting optical member are intermittently performed with respect to a movement of the object.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figure 1:
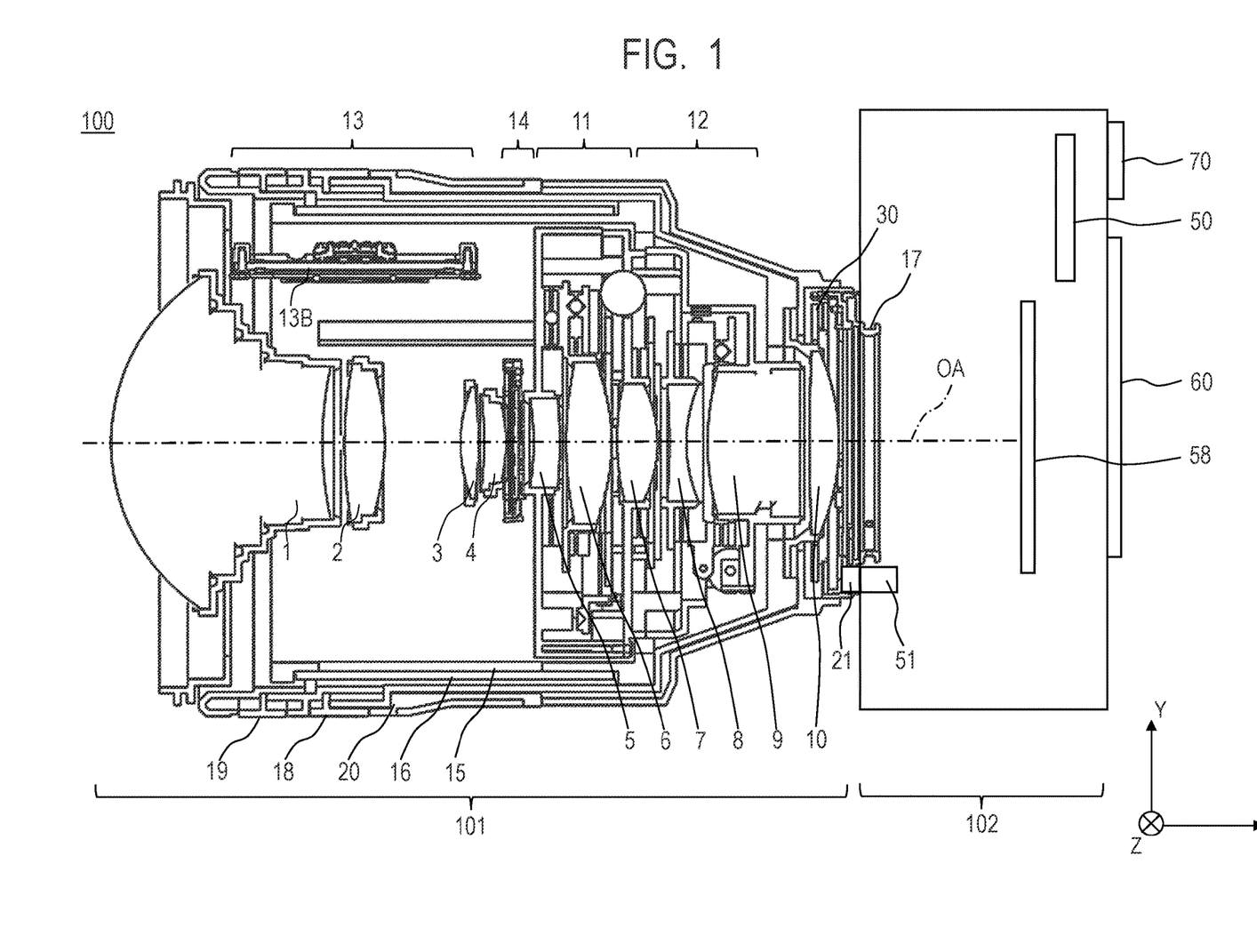
FIG. 1 is a cross-sectional view of a camera system (100) of an embodiment.

FIG. 1 is a cross-sectional view of a lens barrel 101 (lens apparatus) and a camera body 102 constituting a camera system 100 (image pickup apparatus) according to an embodiment of the present disclosure. In the drawings, a direction along an optical axis OA in the lens barrel 101 is defined as an X-axis direction, a pitch direction is defined as a Y-axis direction, and a yaw direction is defined as a Z-axis direction.

The camera body 102 includes an image pickup unit 58 (image pickup element). An image formed through the lens barrel 101 can be exposed to the image pickup unit 58 for an arbitrary time by controlling a shutter (not illustrated) by a camera CPU50, and can be captured. The camera system 100 also includes a display unit 60 having a touch panel function capable of displaying a captured image and changing various settings of the camera system 100, and a finder 70 capable of checking a captured image and inputting a line of sight by looking into the finder 70.

The lens barrel 101 includes a first lens unit 1, a second lens unit 2, a third lens unit 3, a fourth lens unit 4, a fifth lens unit 5, a sixth lens unit 6, a seventh lens unit 7, an eighth lens unit 8, a ninth lens unit 9, and a tenth lens unit 10. The optical system including these lens units has an optical axis OA. A focal length of the lens barrel 101 is changed by changing the positional relationship of each lens unit in the optical axis OA direction. The lens barrel 101 includes a diaphragm mechanism 14 that changes the aperture diameter of the optical system by a lens CPU30.

Each lens unit is held by the lens barrel having a cam follower, and the cam follower is engaged with a straight groove parallel to the optical axis OA of a guide barrel 15 and a cam groove inclined with respect to the optical axis OA of a cam barrel 16. The cam barrel 16 is engaged with a zoom operation ring 20, and when the zoom operation ring 20 rotates, the cam barrel 16 rotates, so that the focal length can be changed by rotating the zoom operation ring 20. In addition, the focal length of the optical system can be detected by a zoom position detector (zoom operation ring rotation detector 20A) (not illustrated) that detects the rotation amount of the zoom operation ring 20.

The second lens unit 2 is a focusing unit capable of adjusting focus by being driven in the optical axis OA direction. A focusing unit 13 includes a guide bar (not illustrated) for guiding the second lens unit 2 in the direction of the optical axis OA, a focus driver 13B (vibration actuators) for driving the second lens unit 2, and a focus position detector 13A (not illustrated) for detecting the moving amount of the second lens unit 2. The focusing unit 13 is driven and controlled by the lens CPU30.

By driving one or both of the sixth lens unit 6 and the eighth lens unit 8 in a direction orthogonal to the optical axis OA, a tilt effect of tilting a focal plane with respect to an imaging plane and a shift effect of moving an image pickup area (angle of view) can be obtained. That is, each of the sixth lens unit 6 and the eighth lens unit 8 is a shifting optical member configured to be movable in a direction orthogonal to an optical axis OA. More specifically, when the sixth lens unit 6 and the eighth lens unit 8 both have a positive refractive power or a negative refractive power, the tilt effect can be obtained by moving the lenses in opposite directions to each other, and the shift effect can be obtained by moving the lenses in the same direction. More specifically, in the case of a combination in which one of the sixth lens unit 6 and the eighth lens unit 8 has a positive refractive power and the other has a negative refractive power, the shift effect can be obtained by moving the lenses in opposite directions to each other, and the tilt effect can be obtained by moving the lenses in the same direction. A first shift unit 11 is constituted by a holding means for holding movably in a direction orthogonal to the optical axis OA, drive means, and a first shift position detector 11A (position detector) that detects a movement distance, and the sixth lens unit 6 is driven by the first shift unit 11. Similarly, a second shift unit 12 is configured to drive the eighth lens unit 8. At this time, the first shift unit 11 and the second shift unit 12 are driven and controlled by the lens CPU30.

The lens barrel 101 is provided with a mount 17, and the mount 17 is connected to a mount (not illustrated) of the camera body 102 so that the lens barrel 101 can be fixed. The lens barrel 101 and the camera body 102 have lens-side electrical contacts 21 and camera-side electrical contacts 51 for connecting the lens CPU30 and the camera CPU50, respectively, so that setting items set on the camera side can be reflected on the lens barrel 101.

Figure 2:
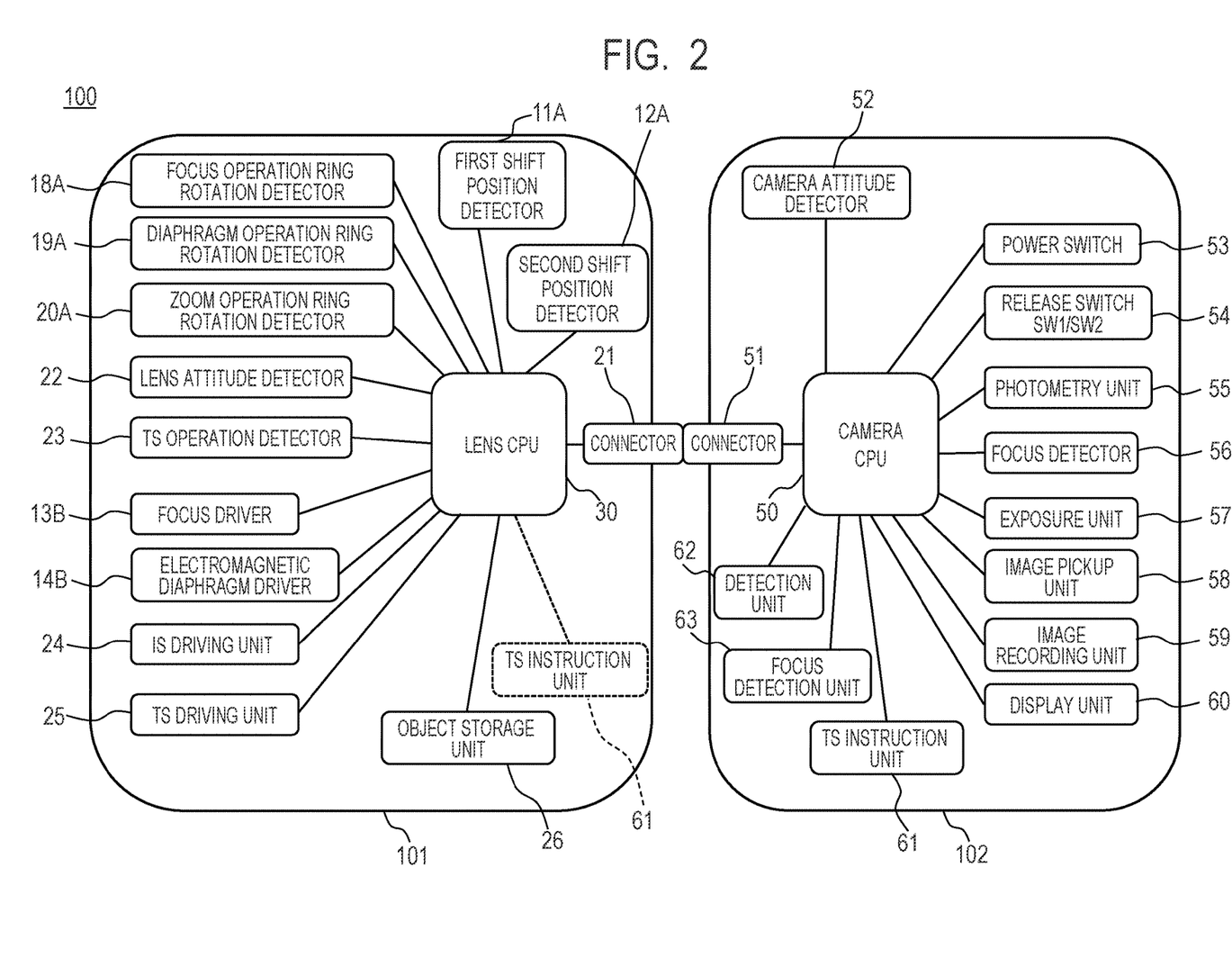
FIG. 2 is an electrical configuration diagram of the camera system (100) according to the embodiment.

FIG. 2 is an electrical configuration diagram of the camera system 100 in the lens barrel 101 and the camera body 102. First, control in the camera body 102 will be described. The camera CPU50 is constituted by a microcomputer. The camera CPU50 controls the operation of each unit in the camera body 102. When the lens barrel 101 is mounted, the camera CPU50 communicates with a lens CPU30 provided in the lens barrel 101 via the lens-side electrical contacts 21 and the camera-side electrical contacts 51.

The information (signal) transmitted from the camera CPU50 to the lens CPU30 includes driving amount information of the second lens unit 2, defocus information, a diaphragm driving command, and attitude information of the camera body 102 based on a signal from a camera attitude detector 52 such as an accelerometer. In addition, the information includes object distance information and position information of the object based on a signal from a TS instruction unit 61 instructing a desired object on which the photographer wants to focus, and also image pickup area information and like instructing the desired image pickup area (field of view). Details of the TS instruction unit 61 will be described later.

The information (signal) transmitted from the lens CPU30 to the camera CPU50 includes optical information such as an imaging magnification of the lens barrel 101 and lens functional information such as zoom and an image stabilization mounted on the mounted lens barrel 101. In addition, attitude information from a lens attitude detector 22 such as a gyro sensor or an acceleration sensor is also included.

Note that the lens-side electrical contacts 21 and the camera-side electrical contacts 51 include contacts for supplying power from the camera body 102 to the lens barrel 101.

A power switch 53 is a switch that can be operated by a photographer, and can activate the camera CPU50 and start power supply to actuators, sensors, and the like in the camera system. A release switch 54 is a switch that can be operated by the photographer, and has a first stroke switch SW1 and a second stroke switch SW2. A signal from the release switch 54 is input to the camera CPU50. The camera CPU50 enters a ready-to-photograph state in response to input of the ON signal from the first stroke switch SW1. In the photographing preparation state, measurement of object brightness by a photometry unit 55 and focus detection by a focus detector 56 are performed.

The camera CPU50 calculates an aperture value of the diaphragm mechanism 14, and an exposure amount (shutter speed) of the image pickup unit 58 based on a photometry result by the photometry unit 55. The camera CPU50 determines the driving amount information (including the driving direction) of the second lens unit 2 for obtaining the in-focus state with respect to the object based on the focus information (defocus amount and defocus direction) which is the detection result of the focus state of the imaging optical system by the focus detector 56. The driving amount information of the second lens unit 2 is transmitted to the lens CPU30. The lens CPU30 controls the operation of each component of the lens barrel 101.

In addition, in the lens barrel 101 of the present embodiment, by driving each or any of the sixth lens unit 6 and the eighth lens unit 8 in a direction orthogonal to the optical axis OA, it is possible to obtain a tilt effect of tilting the focal plane with respect to the imaging plane and the shift effect of moving the image pickup area. Therefore, the camera CPU50 calculates a tilt-driving amount for focusing on a desired object instructed by the TS instruction unit 61. In addition, a shift driving amount for changing the current image pickup area to the image pickup area instructed by the TS instruction unit 61 is calculated. Information on these driving amounts is transmitted from the camera CPU50 to the lens CPU30, and the driving of the sixth lens unit 6 and the eighth lens unit 8 is controlled.

Here, a plurality of objects may be instructed by the TS instruction unit 61. Even if there are a plurality of objects at different distances, it is possible to perform focusing as long as there is at least one object on an object plane 202b (see FIG. 3B) inclined by the above-described tilt effect. Details of photographing using the tilt effect by the tilt operation will be described later.

In addition, the TS instruction unit 61 may be provided in the lens barrel 101 instead of the camera body 102, and the function of the TS instruction unit 61 may be assigned to an existing rotation operation unit, a button switch, or the like of the lens barrel 101 or the camera body 102.

Further, when the camera CPU50 enters a predetermined imaging mode, the camera CPU50 starts eccentric driving of an image stabilization lens (not illustrated), that is, control of an image stabilization. Note that there is a lens barrel 101 that does not have an image stabilization function, and in this case, eccentric driving of the image stabilization lens is unnecessary.

When an ON signal is input from the second stroke switch SW2 of the release switch 54, the camera CPU50 transmits an aperture drive command to the lens CPU30, and the diaphragm mechanism 14 is set to the previously calculated aperture value. In addition, the camera CPU50 transmits an exposure start command to an exposure unit 57 to perform a retraction operation of a mirror (not illustrated) (a mirrorless camera does not have this operation) or an opening operation of a shutter (not illustrated), in the image pickup unit 58, photoelectric conversion of an object image, that is, an exposure operation is performed.

An imaging signal from the image pickup unit 58 is converted into a digital signal by a signal processing unit in the camera CPU50, further subjected to various correction processes, and output as an image signal. The image signal (data) is recorded and stored in a recording medium such as a semiconductor memory such as a flash memory, a magnetic disk, or an optical disk in an image recording unit 59.

In addition, an image captured by the image pickup unit 58 at the time of photographing or an image recorded in the image recording unit 59 can be displayed on the display unit 60 which is a display using a liquid crystal or organic EL technology. In recent years, a touch operation technique is mounted on the display, and the object can be selected and focused on the display for live view imaging. Note that the TS instruction unit 61 is generally included in the display unit 60.

A detection unit 62 and a focus detection unit 63 are electrically connected to the camera CPU50, and control of the detection unit 62 and the focus detection unit 63 will be described later.

Next, control in the lens barrel 101 will be described. Note that the first shift unit 11, the second shift unit 12, the focusing unit 13, and the diaphragm mechanism 14 are electrically connected to the lens CPU30 of the lens barrel 101, and details of control of these units will be described later.

First, each detection unit will be described. The first shift position detector 11A detects the position of the sixth lens unit 6 driven by a first shift driver 11B (driver) included in the first shift unit 11. Similarly, a second shift position detector 12A detects the position of the eighth lens unit 8 driven by a second shift driver 12B (driver) included in the second shift unit 12.

A focus operation ring rotation detector 18A includes a sensor (not illustrated) that detects the rotation of a focus operation ring 18. A diaphragm operation ring rotation detector 19A includes a sensor (not illustrated) that detects the rotation of a diaphragm operation ring 19. The zoom operation ring rotation detector 20A includes a sensor (not illustrated) that detects the rotation of the zoom operation ring 20.

Although not illustrated in FIG. 1, the lens attitude detector 22 is composed of a gyro sensor, an acceleration sensor, and the like, is disposed and fixed inside the lens barrel 101, and is electrically connected to the lens CPU30. The gyro sensor (lens attitude detector 22) detects angular velocities of a vertical (pitch direction) shake and a horizontal (yaw direction) shake, which are angular shakes of the camera system 100, and outputs the detected values to the lens CPU30 as angular speed signals. The lens CPU30 electrically or mechanically integrates angular speed signals in the pitch direction and the yaw direction from the gyro sensor, and calculates a pitch direction shake amount and a yaw direction shake amount (collectively referred to as an angular shake amount) which are displacements in the respective directions.

A TS operation detector 23 includes a manual operation unit (control changing unit) for preparing for obtaining the tilt effect and the shift effect, and a sensor (not illustrated) for detecting the operation amount. That is, when the sixth lens unit 6 and the eighth lens unit 8 are driven in the direction orthogonal to the optical axis OA, the TS operation detector 23 detects a manual operation amount for moving an angle of view A (see FIG. 7A), which will be described later, by a sensor, and drives the sixth lens unit 6 and the eighth lens unit 8.

Next, each driving unit will be described. The focus driver 13B of the focusing unit 13 drives the second lens unit 2 in the direction of the optical axis OA in accordance with the driving amount information of the second lens unit 2 that performs the focusing operation. The driving amount information is determined based on a signal from the camera CPU50. Alternatively, the rotation of the manually operated focus operation ring 18 may be detected by the focus operation ring rotation detector 18A, and the driving amount information may be determined from the signal indicating the focus position manually.

An electromagnetic diaphragm driver 14B of the diaphragm mechanism 14 is controlled by the lens CPU30 that has received a diaphragm drive command from the camera CPU50, and drives the diaphragm mechanism 14 to an aperture state corresponding to a designated aperture value. When the photographer designates a desired aperture value by operating the diaphragm operation ring 19, the lens barrel is driven in the same manner.

An IS driving unit 24 includes a driving actuator of the image stabilization lens (not illustrated) which performs the image stabilization, and a driving circuit thereof. The lens CPU30 controls the IS driving unit 24 based on the above-described combined shift amount of the angular shake amount and a translational shake amount to shift and drive the image stabilization lens (not illustrated in FIG. 1), thereby performing angular shake correction and translational shake correction. Note that this structure and function are not necessary in the lens barrel 101 that does not have the image stabilization function. Further, the lens CPU30 controls the focus driver 13B based on the focus shake amount to drive the second lens unit 2 in the optical axis direction, thereby performing focus shake correction.

A TS driving unit 25 performs a tilting operation so as to obtain a desired inclined focal plane (object plane 202b, see FIG. 3B), and performs a shifting operation so as to obtain a desired image pickup area, in response to range information of the object, position information of the object, and image pickup area information from the camera CPU50. Here, in order to obtain a desired focus, it is needless to say that the TS driving unit 25 and the focus driver 13B are controlled by the lens CPU30 so as to operate optimally. The lens barrel 101 according to the present exemplary embodiment has an optical characteristic in which the focus is changed even when the object distance is not changed by the shift operation. However, it goes without saying that the TS driving unit 25 and the focus driver 13B are optimally controlled in accordance with the characteristics.

Here, in the lens barrel 101 of the present embodiment, the lens CPU30 controls the TS driving unit 25 based on the amount of shake and shift of the lens barrel 101 calculated based on the output from the lens attitude detector 22. For example, in a case where camera shake occurs when photographing is performed by holding the camera system 100 with a hand, the object plane is shifted with respect to the object. However, in the camera system 100 according to the present embodiment, since the position of the object is stored in an object storage unit 26, which will be described later, it is possible to control the TS driving unit 25 to continuously adjust the object plane to the object by correcting the camera shake. To control the TS driving unit 25, a signal from an acceleration sensor mounted on the camera body 102 may be used.

The object storage unit 26 stores the spatial position of the object in the image pickup area, which is instructed by the TS instruction unit 61 or the display unit 60. This position can be defined by the object distance and the coordinates (X, Y) of the imaging plane as an X-Y axis plane, which will be described in detail later.

Figure 3A:
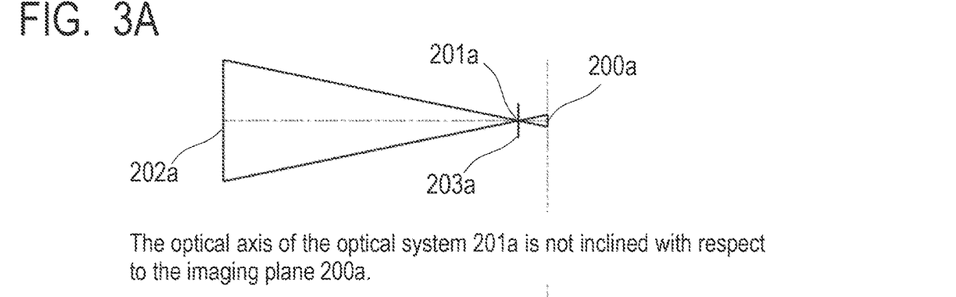
FIG. 3A is a diagram illustrating an in-focus range.
Figure 3B:
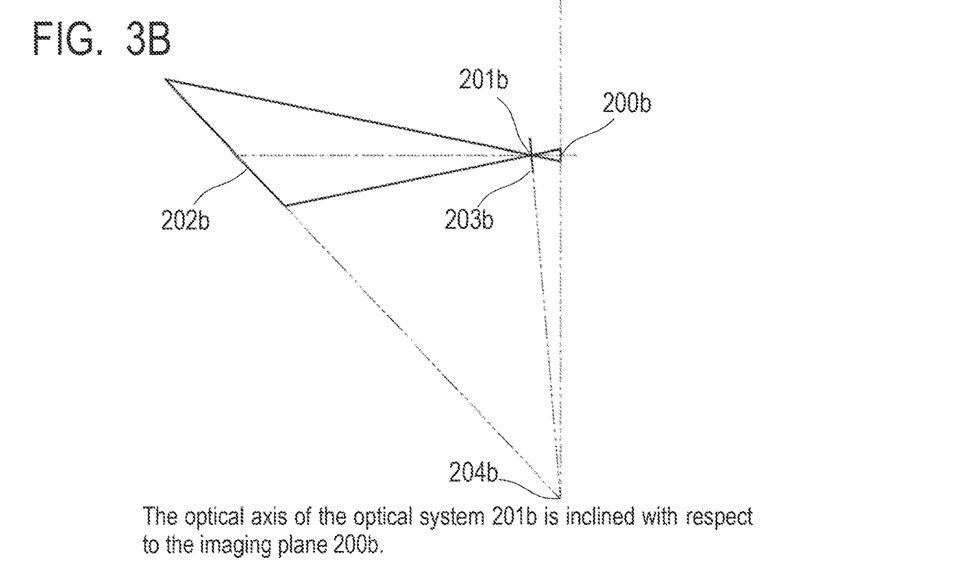
FIG. 3B is a diagram illustrating the principle of Scheimpflug.

Next, the principle of Scheimpflug will be described. FIG. 3A illustrates an in-focus range when the optical axis OA of an optical system 201a is not inclined with respect to an imaging plane 200a. FIG. 3B illustrates an in-focus range based on the Scheimpflug principle when the optical axis OA of an optical system 201b is inclined with respect to an imaging plane 200b.

In the drawing, the imaging plane 200a, the imaging plane 200b, the optical system 201a, the optical system 201b, an in-focus object plane 202a, an in-focus object plane 202b, a principal plane 203a of the optical system, and a principal plane 203b are illustrated. As illustrated in FIG. 3B, when the optical axis OA of the optical system in the lens barrel 101 and the image pickup unit 58 are inclined, the in-focus range on the object side is determined by the Scheimpflug principle. The Scheimpflug principle is that, when an extension of a line tangent to the imaging plane 200b and an extension of a line tangent to the principal plane 203b of the optical system intersect at an intersection point 204b, an extension of a line tangent to the object plane 202b also passes through the intersection point 204b.

When an object to be photographed has a depth, the object can be focused from the front to the back of the object by inclining the object plane 202b along the depth. When it is desired to focus on a depth portion with a lens that does not have a tilt-shift mechanism, a method of deepening a depth of field by narrowing the aperture is common, but with a tilt-shift lens, even if the aperture is open, it is possible to focus in accordance with that depth by performing a tilt operation.

On the contrary, by tilting the principal plane 203b of the optical system 201b in a direction opposite to an inclination of the object having the depth, the object plane 202b can be made to intersect the depth direction of the object at an angle close to a right angle. In this case, since the in-focus range can be extremely narrowed, a dioramic image can be obtained.

Figure 3C:
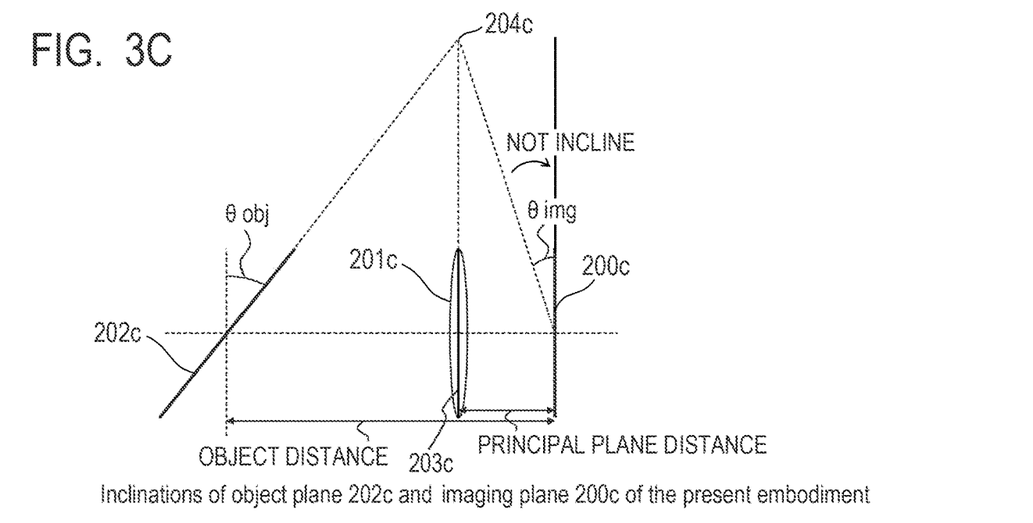
FIG. 3C is a view illustrating that Scheimpflug is applied in the embodiment.

FIG. 3C is a diagram illustrating that the Scheimpflug principle is applied. In the present embodiment, the inclination θ obj of an object plane 202c is generated not by the method of inclining an optical system 201c but by utilizing an image plane inclination by decentering the optical elements. However, when the Scheimpflug principle is applied to the object plane 202c and a principal plane 203c of the optical system 201c in which the inclination does not occur, the image plane inclination of the angle θ img should occur in an imaging plane 200c. Therefore, the angle θ img is corrected by the eccentricity of the optical system 201c, and the imaging plane 200c is tilted without tilting the object plane 202c, so that a desired object can be focused. With this configuration, an extension line of a line inclined at the angle θ img from the imaging plane 200c and an extension line of the principal plane 203c of the optical system intersect at an intersection point 204c, and an extension line of a line in contact with the object plane 202c also passes through the intersection point 204c. Therefore, it can be seen that the Scheimpflug principle is applied.

On the other hand, when a predetermined imaging plane tilt correction effect is to be secured, the eccentricity amount of the optical system 201c increases, and a composition deviation increases. Therefore, the other lens designed to reduce an aberration variation at the time of decentering is moved so as not to increase the composition deviation. That is, in the present embodiment, at least one of the sixth lens unit 6 and the eighth lens unit 8 corresponding to the optical system 201c is eccentrically operated to solve the problem that the composition deviation increases.

Next, a method of shifting the sixth lens unit 6 and the eighth lens unit 8, which are main parts of the present embodiment, in a direction orthogonal to the optical axis OA and performing a plurality of following shots (tracking shots) with different compositions in one photographing operation will be described.

Figure 4A:
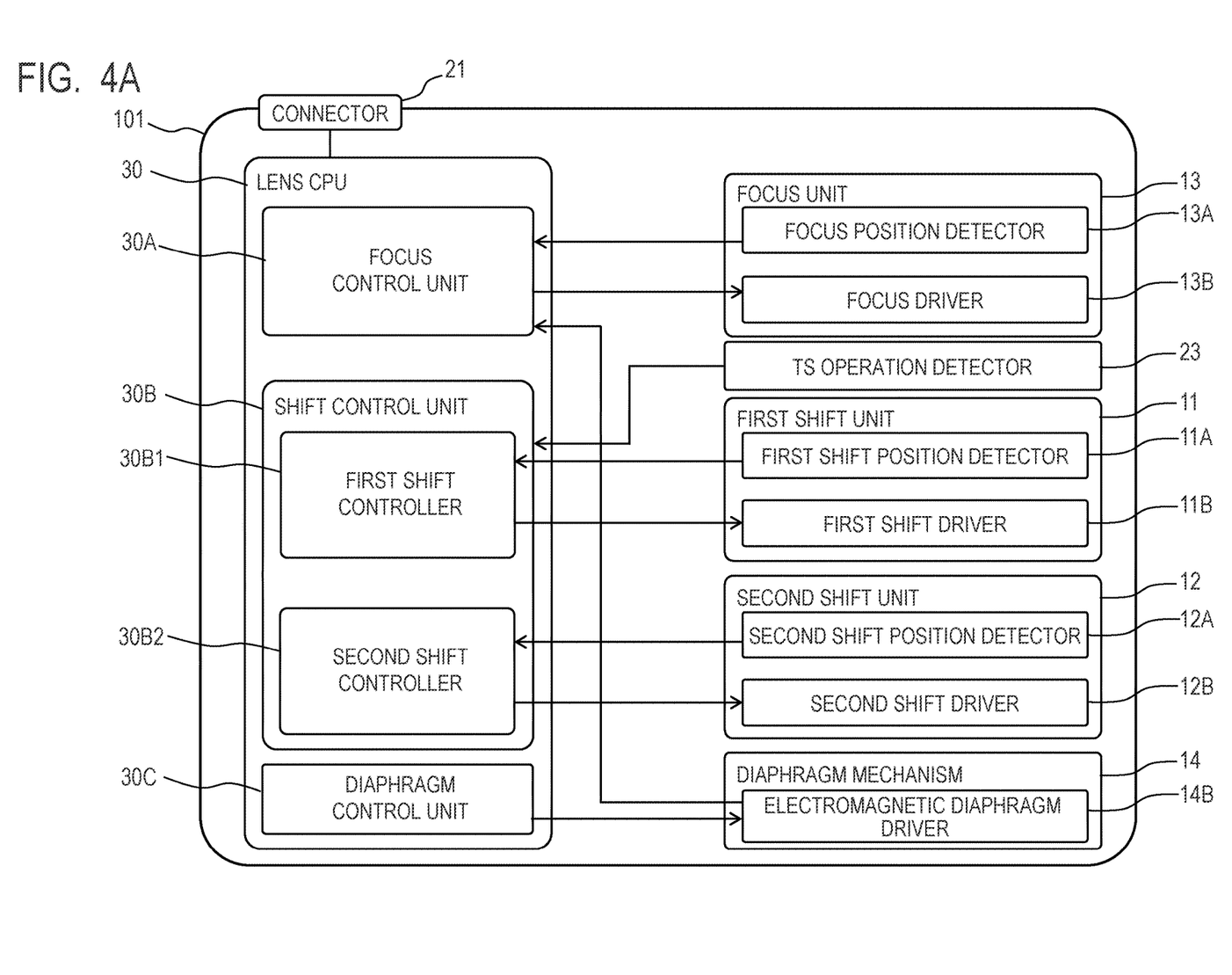
FIG. 4A is a diagram illustrating a configuration of a lens barrel (101) necessary for performing a plurality of following shots with different compositions.
Figure 4B:
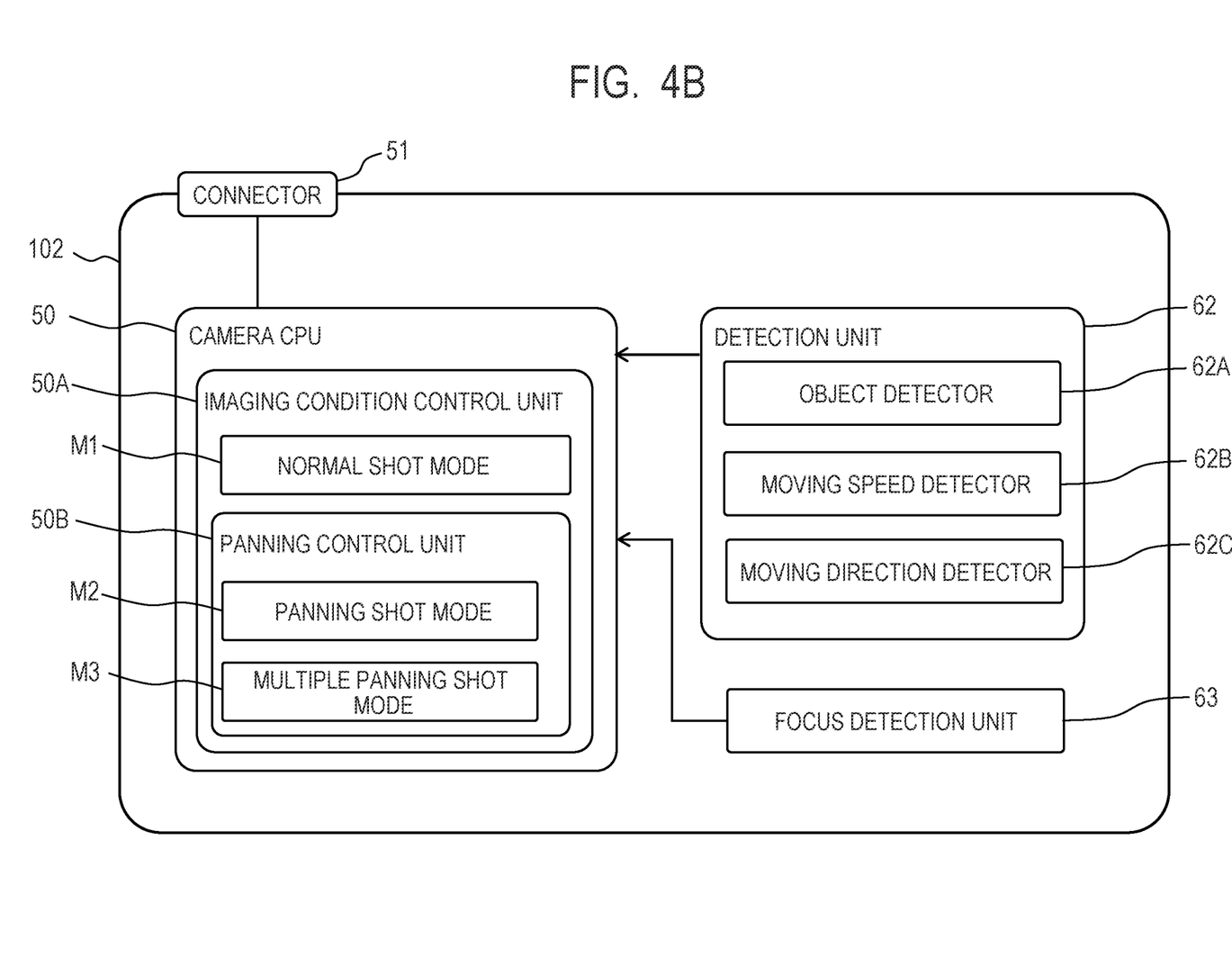
FIG. 4B is a diagram illustrating a configuration of a camera body (102) necessary for performing a plurality of times of following shots with different compositions.

FIG. 4A illustrates a control mode of the lens CPU30 when a plurality of following shots is performed with different compositions, and FIG. 4B illustrates a control mode of the camera CPU50 when a plurality of following shots is performed with different compositions.

First, a control flow by the lens CPU30 will be described with reference to FIG. 4A. The lens CPU30 includes a focus control unit 30A, a shift control unit 30B, and a diaphragm control unit 30C. The shift control unit 30B includes a first shift controller 30B1 and a second shift controller 30B2. The shift control unit 30B performs control based on a signal from the TS operation detector 23.

The first shift unit 11 includes a first shift position detector 11A and a first shift driver 11B. The first shift driver 11B drives the sixth lens unit 6 in response to instructions from the first shift controller 30B1. The first shift position detector 11A detects the position of the sixth lens unit 6 and outputs the detected position to the first shift controller 30B1.

The second shift unit 12 includes the second shift position detector 12A and a second shift driver 12B. The second shift driver 12B drives the eighth lens unit 8 in response to instructions from the second shift controller 30B2. The second shift position detector 12A detects the position of the eighth lens unit 8 and outputs the detected position to the second shift controller 30B2. The first shift driver 11B and the second shift driver 12B are included in the TS driving unit 25.

The focusing unit 13 includes the focus position detector 13A and the focus driver 13B. The focus driver 13B drives the second lens unit 2, which is the focusing unit, in response to instructions from the focus control unit 30A. Then, the focus position detector 13A detects the position of the second lens unit 2 and outputs it to the focus control unit 30A.

The diaphragm mechanism 14 includes the electromagnetic diaphragm driver 14B. The electromagnetic diaphragm driver 14B drives the diaphragm mechanism 14 in response to instructions from the diaphragm control unit 30C, and brings the diaphragm mechanism 14 into an open state corresponding to a designated aperture value.

Next, a control flow by the camera CPU50 will be described with reference to FIG. 4B. The camera body 102 includes the detection unit 62 and the focus detection unit 63. The detection unit 62 includes an object detector 62A that detects an object entering the image pickup area, a moving speed detector 62B that detects the moving speed of the object moving in the image pickup area, and a moving direction detector 62C that detects the moving direction of the object. The focus detection unit 63 measures the range to the object detected by the object detector 62A.

Each object information detected by the detection unit 62 and the focus detection unit 63 is output to the camera CPU50, converted into control information of the moving speed and the moving direction of the first shift unit 11 and the second shift unit 12 in the camera CPU50, and output to the shift control unit 30B of the lens CPU30.

The camera CPU50 includes an imaging condition control unit 50A (condition control unit) that controls an imaging condition. The imaging condition control unit 50A has a normal shot mode M1 and a following shot mode (control mode) in which photographing is performed by intermittently controlling exposure and driving of the first shift unit 11 and the second shift unit 12 with respect to the movement of the object. The following shot mode includes a following shot mode M2 (first mode) in which the following shot of the object is performed and a multiple following shot mode M3 (second mode) in which the following shot of the object is performed multiple times. The imaging condition control unit 50A includes a panning control unit 50B for switching the shot mode from the normal shot mode M1 to the following shot mode M2 or the multiple following shot mode M3 according to the selection of the photographer. The switching is not limited to the switching by the selection of the photographer, and the imaging condition control unit 50A may switch between the following shot mode M2 and the multiple following shot mode M3.

The following shot mode M2 and the multiple following shot mode M3 in the present embodiment are following shot modes in which the photographer performs following shot without shaking the camera system 100 by driving the first shift unit 11 and the second shift unit 12 to follow the object.

Figure 5:
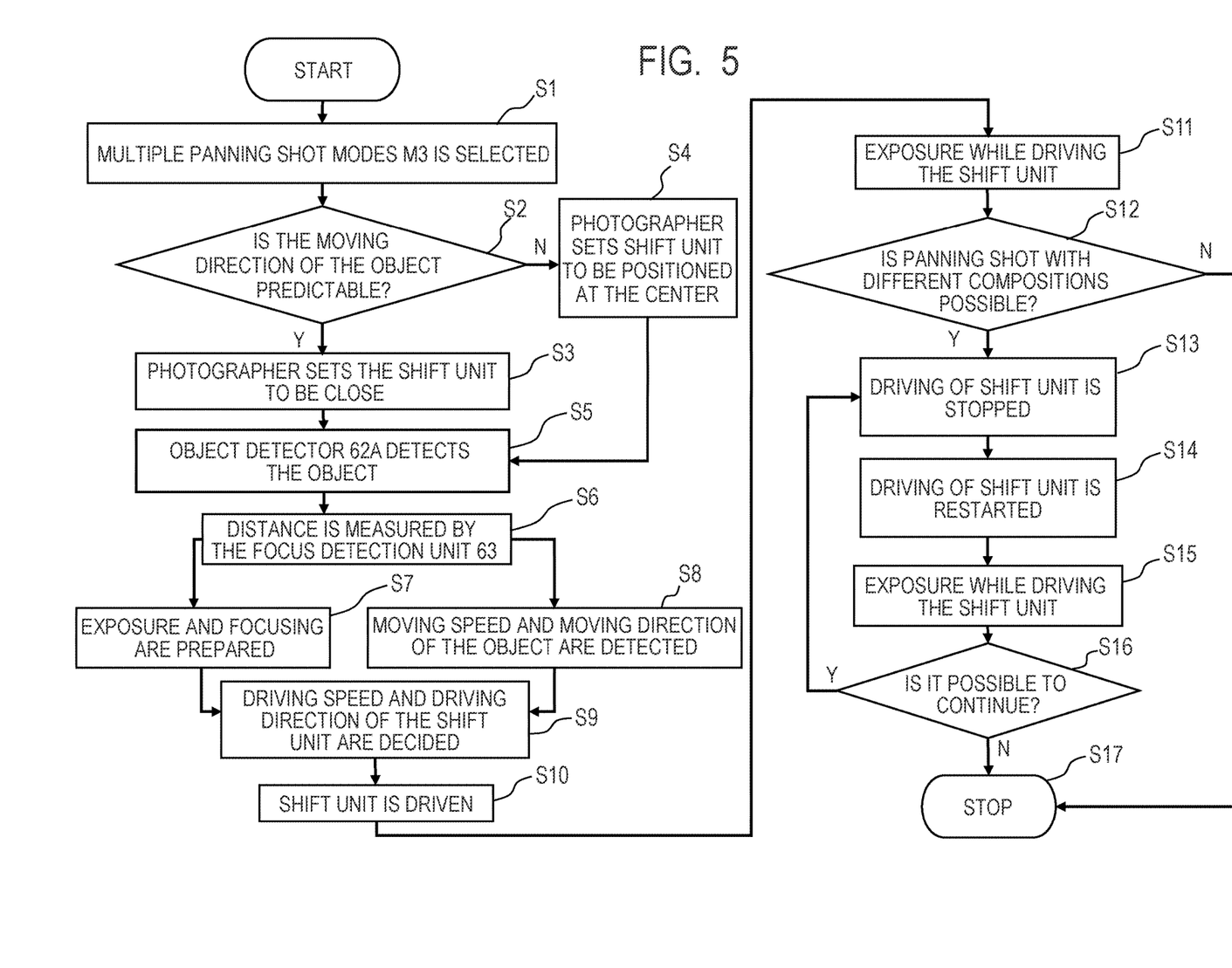
FIG. 5 is a flowchart of a control method for performing a plurality of following shots with different compositions.

FIG. 5 is a flowchart of control when a plurality of times of following shot with different compositions are performed in the multiple following shot mode M3.

Figure 6A:
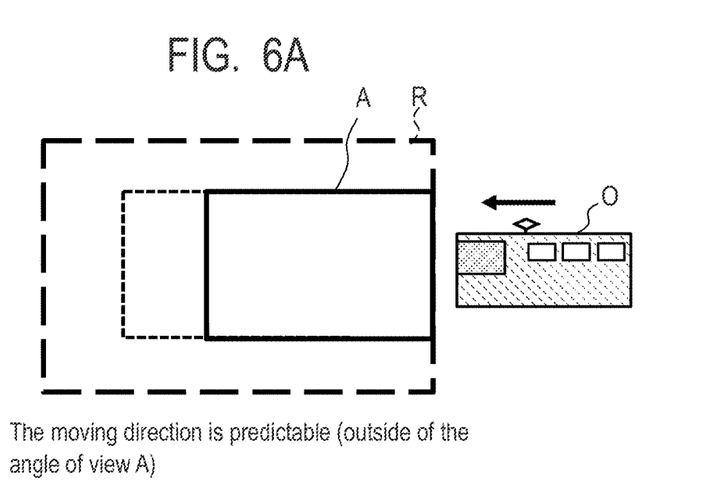
FIG. 6A, FIG. 6B, FIG. 6C and FIG. 6D are diagrams illustrating object situations that may occur when a following shot is performed.
Figure 6B:
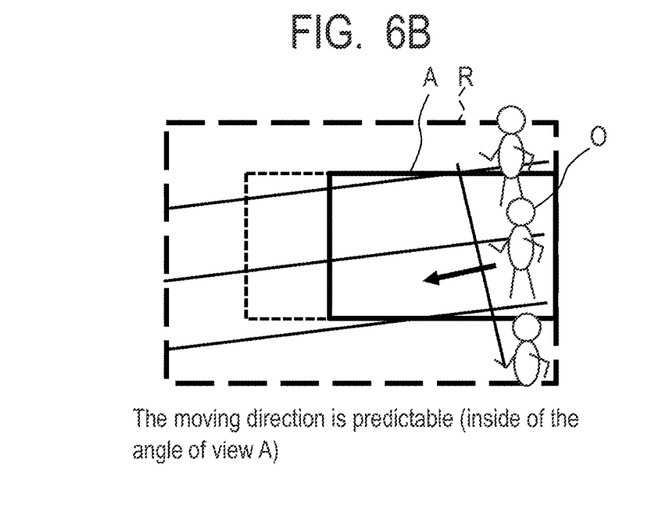
Figure 6C:
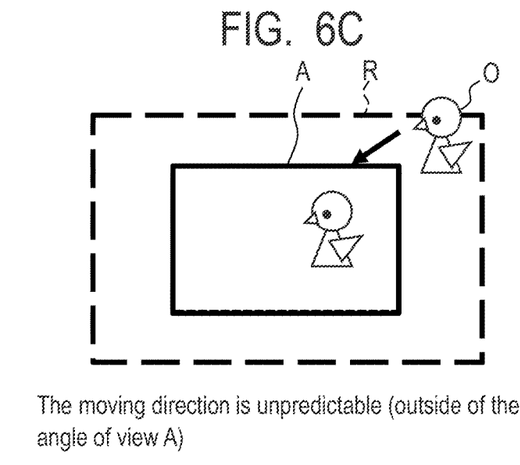
Figure 6D:
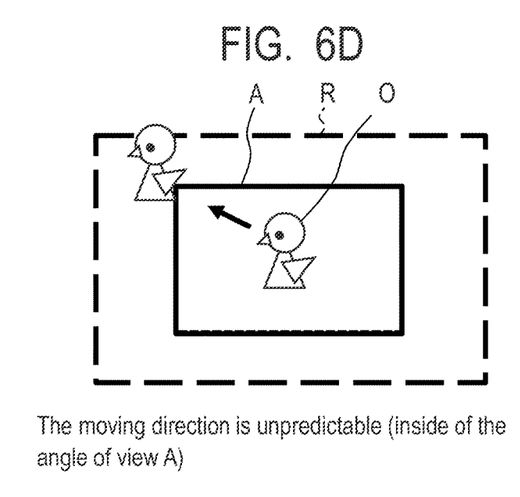

FIG. 6A to FIG. 6D are diagrams illustrating object situations that may occur when a following shot is performed. FIG. 6A illustrates a situation in which an object O whose moving direction is predictable is photographed when the object O enters the angle of view A from the outside of the angle of view A. FIG. 6B illustrates a situation in which the object O whose moving direction can be predictable is photographed inside of the angle of view A. FIG. 6C illustrates a situation in which the object O whose moving direction is unpredictable is photographed when the object O enters the angle of view A from the outside of the angle of view A. FIG. 6D illustrates a situation in which the object O whose moving direction is unpredictable is photographed inside of the angle of view A. The angle of view A is movable in a movable range R.

FIG. 7A to FIG. 7H are diagrams illustrating a flow when performing a plurality of times of following shot with different compositions on the object O whose moving direction can be predictable as in FIG. 6A, for example. Hereinafter, a flow of a plurality of following shot modes with different compositions will be described with reference to FIG. 5 and FIG. 7A to FIG. 7H.

First, in step S1 of FIG. 5, the photographer selects the following shot mode (the following shot mode M2 or the multiple following shot modes M3). Next, proceeding to step S2, the photographer determines whether or not the moving direction of the object O is predictable. If the moving direction can be predictable (Y), the process proceeds to step S3. If the moving direction cannot be predictable (N), the process proceeds to step S4. Examples of the object O whose moving direction can be predictable include a train, a car race, a horse race, a cycle road race, and a foot race as illustrated in FIG. 6A and FIG. 6B, which move in one direction or on a fixed course. As an unpredictable object O, for example, a creature such as a bird or a cat or a child as illustrated in FIG. 6C and FIG. 6D, or an object whose motion is irregular and whose course is not determined, such as a set play of sports, may be exemplified.

The movable range R in FIG. 7A to FIG. 7H illustrating an example in which the object O is a train indicates a range in which the angle of view A can be moved by driving the first shift unit 11 and the second shift unit 12.

Figure 7A:
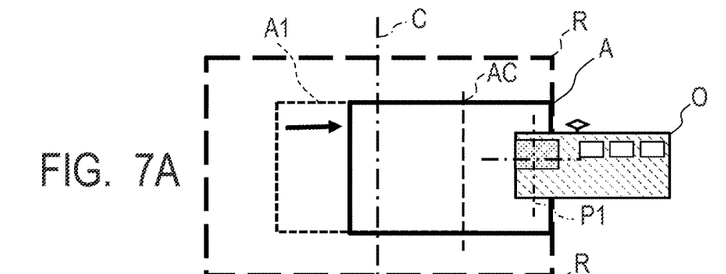
FIG. 7A, FIG. 7B, FIG. 7C, FIG. 7D, FIG. 7E, FIG. 7F, FIG. 7G and FIG. 7H are diagrams illustrating a flow when performing a plurality of times of following shot with different compositions.

In the step S3, the photographer operates the manual operation unit of the TS operation detector 23 to drive the first shift unit 11 and the second shift unit 12 to move an initial angle of view A1 to a position (angle of view A) at which the object O enters the movable range R illustrated in FIG. 7A. In this case, the photographer sets at least one of the sixth lens unit 6 and the eighth lens unit 8 to be close. The manual operation unit can be operated on the display unit 60 having a touch panel function. Note that, since the multiple following shot mode M3 is selected in step S1, the driving of the first shift unit 11 and the second shift unit 12 is set in the following shot mode that is performed intermittently. However, since the photographer operates the manual operation section of the TS operation detector 23, the following shot mode is changed to control for driving the first shift unit 11 and the second shift unit 12 by the TS operation detector 23. In this way, the manual operation unit moves at least one of the sixth lens unit 6 and the eighth lens unit 8 in a direction corresponding to the movement of the object O. By setting the initial angle of view A1 to the angle of view A in step S3, it is possible to increase the driving amount of the first shift unit 11 and the second shift unit 12 when performing the following shot. With this setting, the following shots can be performed more effectively.

In step S4, the first shift unit 11 and the second shift unit 12 are not driven, and the angle of view is not changed. That is, the photographer sets at least one of the sixth lens unit 6 and the eighth lens unit 8 of the shift unit to be positioned at the center. In step S4, as illustrated in FIG. 6C and FIG. 6D, the angle of view is not changed, so that a constant driving amount can be obtained for the first shift unit 11 and the second shift unit 12.

Next, the process proceeds to step S5, and the object detector 62A detects the object O. This is performed at the timing when a part of the object O enters the angle of view A as illustrated in FIG. 7A.

Next the process proceeds to step S6 and the distance measurement is performed by the focus detection unit 63, distance information to the object O is obtained. Next, the process proceeds to step S7 and step S8. In step S7, the camera CPU50 measures the object brightness by the photometry unit 55 and detects the focus by the focus detector 56, and focusing is performed on the object O, that is, photographing preparation such as exposure and focusing is performed. In Step S8, the moving speed and the moving direction of the object O are detected by the moving speed detector 62B and the moving direction detector 62C. The moving speed and the moving detection can be calculated from the time during which the object O is captured between two predetermined points in the angle of view A and the object distance information obtained by the focus detection unit 63, but is not limited thereto. In the present embodiment, the moving speed of the object O is calculated the object distance information and the time from when the object O appears at a point P1 in FIG. 7A until when the object O appears at a point P2 in FIG. 7B. Note that if the moving direction of the object is predictable, the detection unit 62 may detect at least one of the moving speed and the moving direction of the object.

Next, the process proceeds to step S9. In step S9, in order to perform following shot, the imaging condition control unit 50A determines the driving speed and the driving direction of the shift unit based on the moving speed and the moving direction of the object O detected in step S8. The imaging condition control unit 50A calculates the driving speed of the first shift unit 11 and the second shift unit 12 for moving the angle of view A in accordance with the movement of the object O.

Next, the process proceeds to step S10, and the shift control unit 30B starts driving the first shift unit 11 or the second shift unit 12 to drive at least one of the sixth lens unit 6 and the eighth lens unit 8 based on the driving speed information calculated in step S9. The timing to start driving may be when the object O enters a predetermined position such as a central portion AC of the angle of view A, or may be started immediately after the calculation in step S9 is completed. In addition, the photographer may arbitrarily determine it.

Figure 7B:
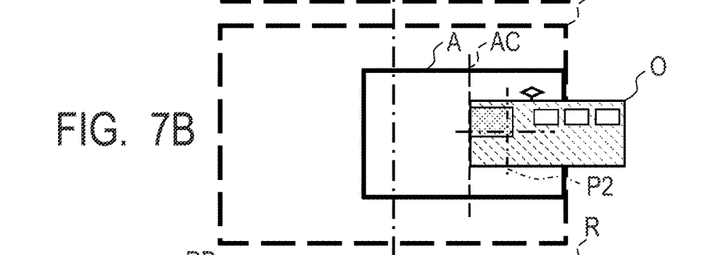
Figures 7C, 7F, 7G, 7H:
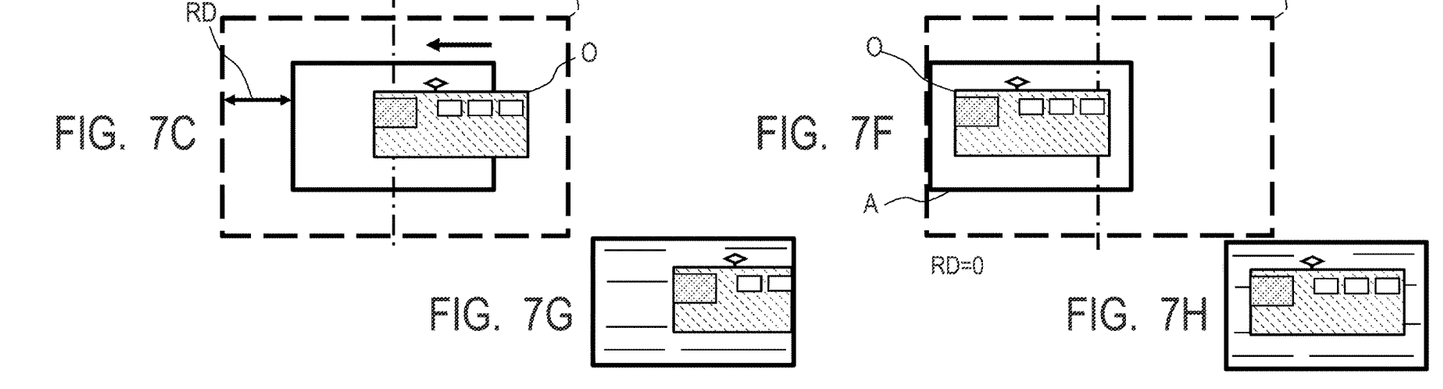

Next, the process proceeds to step S11, and an ON signal from the second stroke switch SW2 is input while the first shift unit 11 or the second shift unit 12 is driven. That is, the photoelectric conversion (exposure operation) of an object image is performed in the image pickup element of the image pickup unit 58. The ON signal from the second stroke switch SW2 may be input by the photographer actually pressing the second stroke switch SW2, or may be automatically input at a preset timing. In FIG. 7B and FIG. 7C, the driving of the angle of view A is started based on the moving speed of the object O calculated at the timing when the object O reaches the central portion AC of the angle of view A. Then, the ON signal from the second stroke switch SW2 is input at the timing when the object O comes to a central portion C of the initial angle of view A1 before the angle of view is changed, and the exposure operation is performed. Even during the exposure operation, the first shift unit 11 and the second shift unit 12 continue to be driven in accordance with the object O, so that a following shot effect is obtained, and the following shot as illustrated in FIG. 7G is completed.

Next, the process proceeds to step S12, and the imaging condition control unit 50A determines whether or not following shot with different compositions is possible. At a timing when the first following shot is completed in step S11, whether or not the following shot can be performed is determined by the driving speed and the exposure time with respect to a remaining driving amount RD (refer to FIG. 7C) of the first shift unit 11 and the second shift unit 12. If the following shot can be continued (Y), the process proceeds to step S13, if the following shot cannot be continued (N), the process proceeds to step S17 to end the imaging. In addition, also in a case where the multiple following shot mode M3 for performing the following shot with different composition is not selected in step S1, the process proceeds to step S17 and the photographing is ended.

In step S13, the driving of the first shift unit 11 and the second shift unit 12, which is the shift driving, is stopped. By stopping the driving of the first shift unit 11 and the second shift unit 12, the movement of the angle of view A is stopped (see FIG. 7C and FIG. 7D). Alternatively, the driving speed may be decreased as long as the movement of the angle of view A is delayed with respect to the movement of the object O.

Next, the process proceeds to step S14, and the driving of the first shift unit 11 and the second shift unit 12 is restarted.

Figure 7D:
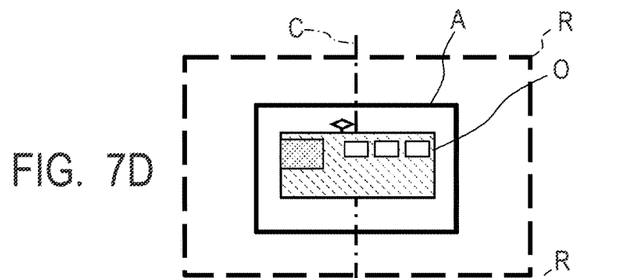
Figure 7E:
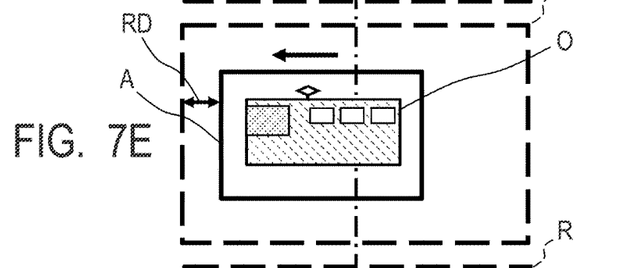

In FIG. 7D, although the movement of the angle of view A has been stopped, since the object O continues to move even during that time, the composition changes to a composition in which the object O advances in the advancing direction with respect to the angle of view A. By resuming the driving of the first shift unit 11 and the second shift unit 12, as illustrated in FIG. 7E, the angle of view A moves again in accordance with the object O, and the remaining driving amount RD decreases. As a result, a composition in which the object O is advanced in the moving direction with respect to the angle of view A at the time of the first photographing is obtained.

Next, the process proceeds to step S15, and the exposure operation is performed again while driving the first shift unit 11 and the second shift unit 12, thereby completing the second photographing in which the composition is changed with respect to the first photographing as illustrated in FIG. 7H.

Thereafter, the process proceeds to step S16, and it is determined again whether or not it is possible to continue a plurality of times of following shot with different compositions. If it is determined that the photographing can be continued (Y), the process returns to Step S13, and the photographing is repeated until it is determined that the photographing cannot be continued. If it is determined that the photographing cannot be continued in Step S16 (N), the process proceeds to Step S17, and the photographing is ended. In FIG. 7F, the angle of view A has reached the limit of the movable range R at the time when the second photographing is completed, and the remaining driving amount RD is zero, and thus it is determined that the photographing cannot be continued, and the photographing is ended. That is, in the following shot mode of the imaging condition control unit 50A, the exposure and the driving of the sixth lens unit 6 and the eighth lens unit 8 are intermittently performed with respect to the movement of the object O. Then, the following shot mode is executed until the movement of the shifting optical member is completed based on the detected positions of the sixth lens unit 6 and the eighth lens unit 8 and the control states of the first shift driver 11B and the second shift driver 12B.

With the above-described configuration and processing method, it is possible to perform a plurality of times of following shot with different compositions in one imaging operation while enabling following shot that does not depend on the skill of the photographer. According to the present embodiment, it is possible to provide an image pickup apparatus capable of following shot a plurality of times with different compositions.

Although the example in which the moving direction of the object O can be predictable as illustrated in FIG. 6A has been described, the same determination is performed in step S12 even when the object O whose moving direction cannot be predictable as illustrated in FIG. 6C and FIG. 6D is photographed by a plurality of times of following shot with different compositions. The focusing by the focus detector 56 in step S7 may be omitted by, for example, setting the in-focus position in advance.

The lens barrel 101 of the present embodiment is configured to be detachably attached to the camera body 102 as illustrated in FIG. 1, but the camera body 102 and the lens barrel 101 may be integrally configured.

Although the preferred embodiments of the present disclosure have been described above, the present disclosure is not limited to these embodiments, and various modifications and changes can be made within the scope of the gist of the present disclosure.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-123340, filed Aug. 2, 2022, which is hereby incorporated by reference herein in its entirety.

What is claimed is:

1. An image pickup apparatus comprising:
   at least one shifting optical member configured to be movable in a direction orthogonal to an optical axis;
   a driving unit configured to drive the shifting optical member;
   a position detector configured to detect a position of the shifting optical member;
   a condition control unit that controls imaging conditions;
   a detection unit configured to detect at least one of a moving speed and a moving direction of an object; and
   a shift control unit configured to control the shifting optical member based on a signal from the detection unit;
   wherein the condition control unit has a control mode in which an exposure and a driving of the shifting optical member are intermittently performed with respect to a movement of the object.

2. The image pickup apparatus according to claim 1, wherein the control mode is executed until the movement of the shifting optical member is completed based on the position of the shifting optical member detected by the position detector and a control state of the shift control unit.

3. The image pickup apparatus according to claim 1, wherein the control mode includes a first mode in which a following shot of the object is performed and a second mode in which the following shot of the object is performed a plurality of times.

4. The image pickup apparatus according to claim 1, further comprising a control changing unit configured to change the control mode depending on whether or not the moving direction of the object is predictable.

5. The image pickup apparatus according to claim 4, wherein the control changing unit moves the shifting optical member in a direction corresponding to the movement of the object when the moving direction of the object is predictable.

6. The image pickup apparatus according to claim 1, wherein a tilt effect of tilting a focal plane with respect to an imaging plane or a shift effect of moving an image pickup area is obtained by driving the shifting optical member in a direction orthogonal to the optical axis.

7. The image pickup apparatus according to claim 6, wherein the tilt effect is obtained by driving the two shifting optical members in opposite directions.

8. The image pickup apparatus according to claim 6, wherein the shift effect is obtained by driving the two shifting optical members in the same direction.

9. An image pickup apparatus comprising:
   at least one shifting optical member configured to be movable in a direction orthogonal to an optical axis;
   a driving unit configured to drive the shifting optical member;
   a position detector configured to detect a position of the shifting optical member;
   a condition control unit that controls imaging conditions;
   a detection unit configured to detect at least one of a moving speed and a moving direction of an object; and
   a shift control unit configured to control the shifting optical member based on a signal from the detection unit;
   wherein the condition control unit has a control mode in which an exposure and a driving of the shifting optical member are intermittently performed with respect to a movement of the object, and
   wherein a lens device including the shifting optical member and an optical system that forms an object image on an image pickup element is detachably mounted.

* * * * *